United States Patent [19]

Boyette et al.

[11] Patent Number: 5,490,390
[45] Date of Patent: Feb. 13, 1996

US005490390A

[54] LIQUEFACTION OF CHLORINE OR OTHER SUBSTANCES

[75] Inventors: James H. Boyette; Leo C. Comeaux; Angel L. Siso; J. Douglas Mansell, all of Calcasieu Parish, La.; Jonn E. Fike, Jr., Pittsburgh, Pa.

[73] Assignee: PPG Industries, Inc., Pittsburgh, Pa.

[21] Appl. No.: 242,809

[22] Filed: May 13, 1994

[51] Int. Cl.$^6$ ........................................................ F25J 1/00
[52] U.S. Cl. ........................................ 62/9; 62/40; 62/434
[58] Field of Search ............................... 62/9, 40, 434

[56] References Cited

U.S. PATENT DOCUMENTS

| | | | |
|---|---|---|---|
| 2,556,850 | 6/1951 | Ogorzaly | 62/40 |
| 2,896,414 | 7/1959 | Tung | 62/9 |
| 2,964,913 | 12/1960 | Smith | 62/9 |
| 2,984,078 | 5/1961 | Schmidt et al. | 62/9 |
| 3,596,472 | 8/1971 | Streich | 62/40 |

OTHER PUBLICATIONS

Ashrae Handbook of Fundamentals, p. 575 Mar. 3, 1975.

*Primary Examiner*—Ronald C. Capossela
*Attorney, Agent, or Firm*—George D. Morris

[57] ABSTRACT

A process for liquifying a substance comprises: (a) transferring latent heat from the substance in the gaseous state to a first heat transfer fluid passing through a first loop wherein the first heat transfer fluid is substantially isolated from the substance and is unreactive with the substance; (b) transferring heat from the first heat transfer fluid to a second heat transfer fluid passing through a second loop wherein the second heat transfer fluid is substantially isolated from the substance and from the first heat transfer fluid; and (c) transferring heat from the second heat transfer fluid to a third heat transfer fluid wherein the third heat transfer fluid is substantially isolated from the substance, from the first heat transfer fluid, and from the second heat transfer fluid. The preferred substance is molecular chlorine.

25 Claims, 2 Drawing Sheets

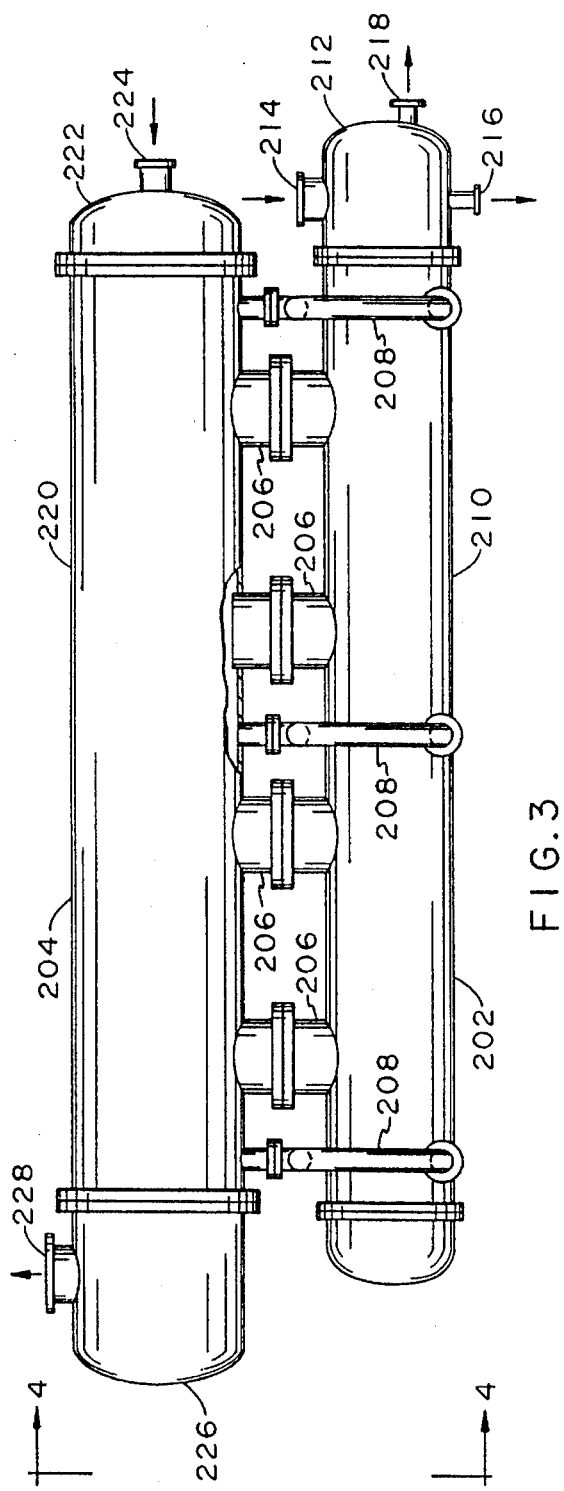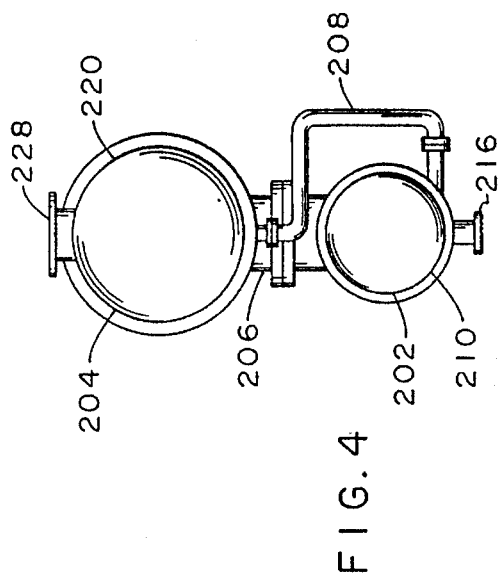

LIQUEFACTION OF CHLORINE OR OTHER SUBSTANCES

BACKGROUND OF THE INVENTION

One of the last steps in the commercial production of molecular chlorine by the electrolysis of aqueous sodium chloride is usually liquefaction of the molecular chlorine. This is often accomplished by removing heat from the chlorine in a condenser cooled by a heat transfer fluid passing through a loop which includes the condenser for liquefying chlorine, one or more compressors, one or more heat exchangers for removing heat after compression, and an expansion valve, i.e., a single-loop system. Alternatively, a second heat transfer fluid passes through the a heat exchanger for cooling the first heat transfer fluid rather than for liquefying chlorine, and the cooled first heat transfer fluid is used in a separate loop to liquefy the chlorine in a condenser, i.e., a two-loop system.

Normally the chlorine and the heat transfer fluid used to liquefy the chlorine are substantially isolated from each other. A problem of particular concern in chlorine liquefaction plants, however, is one of safety in the event the chlorine and the heat transfer fluid used to liquefy the chlorine come into mutual contact. When such mutual contact does occur, it is usually, but not necessarily, due to failure of the condenser through which both materials flow. The failure can range from inconsequential, as for example where a very small leak and little or no reaction have occurred, to catastrophic, as for example where there is a major rupture of one or more tubes within the condenser and an explosion ensues. Between these extremes important adverse consequences can occur, as for example unacceptable contamination of the chlorine by heat transfer fluid or vice versa, with or without contamination by reaction products.

Heretofore trichlorofluoromethane, dichlorodifluoromethane, or chlorodifluoromethane has been used in a single loop system to liquefy molecular chlorine. Chlorodifluoromethane is reactive with molecular chlorine. Trichlorofluoromethane and dichlorodifluoromethane are not reactive with molecular chlorine at the temperatures used in chlorine liquefaction systems; they are, however, suspected ozone depleters and hence are being replaced by other materials. The replacements previously proposed contain more than a trivial amount of hydrogen in the molecule and are therefore reactive with molecular chlorine.

Trichlorofluoromethane or dichlorodifluoromethane has also been used as the second heat transfer fluid (i.e., the heat transfer fluid not passing through the condenser in which the chlorine is liquefied) in a two-loop system. In such cases the first heat transfer fluid has been reactive with molecular chlorine. In some instances the first heat transfer fluid is reactive because it contains enough hydrogen to support reaction; an example of such a heat transfer fluid is methylene chloride. In others, the first heat transfer fluid is reactive because it contains large amounts of water which can react with the molecular chlorine, albeit not explosively, as is the case, for example, with aqueous calcium chloride solution. The resulting acidic solution is very corrosive to many steels and other constructional materials.

THE INVENTION

In its broader aspects, the present invention promotes safety in chlorine liquefaction systems by providing multiple-loop systems where the heat transfer fluid passing through the same condenser as the chlorine is unreactive with the chlorine.

Accordingly, the invention is a process for liquefying chlorine comprising: (a) transferring latent heat from gaseous molecular chlorine to a first heat transfer fluid passing through a first loop, wherein the first heat transfer fluid is substantially isolated from the molecular chlorine; (b) transferring heat from the first heat transfer fluid to a second heat transfer fluid passing through a second loop, wherein the second heat transfer fluid is substantially isolated from the molecular chlorine and from the first heat transfer fluid; and (c) transferring heat from the second heat transfer fluid to a third heat transfer fluid wherein the third heat transfer fluid is substantially isolated from the molecular chlorine, from the first heat transfer fluid, and from the second heat transfer fluid; wherein the first heat transfer fluid is selected from the group consisting of: (d) at least one perhalogenated methane represented by the formula $CCl_{(4-i)}F_i$ where i is 1, 2, 3, or 4; (e) at least one perhalogenated ethane represented by the formula $C_2Cl_{(6-j)}F_j$ where j is 3, 4, 5, or 6; (f) at least one perhalogenated propane represented by the formula $C_3Cl_{(8-k)}F_k$ where k is 4, 5, 6, 7, or 8; (g) at least one halogenated ethane represented by the formula $C_2HCl_{(5-x)}F_x$ where x is 3, 4, or 5; (h) at least one halogenated propane represented by the formula $C_3HCl_{(7-y)}F_y$ where y is 4, 5, 6, or 7; (i) at least one perfluorinated normal alkane containing from 4 to 8 carbon atoms; (j) at least one perhalogenated cyclobutane represented by the formula $C_4Cl_{(8-z)}F_z$ where z is 6, 7, or 8; (k) perfluoro-1,3-dimethylcyclohexane [CAS 335-27-3]; (l) perfluoro(methyldecalin) [CAS 51294-16-7]; (m) carbon dioxide; and (n) a mixture thereof.

It is of course desirable that the molecular chlorine and the various heat transfer fluids be totally isolated from each other. Unfortunately, heat exchangers (including condensers) often exhibit imperfections incurred during manufacture or through use such that at least one of the fluids passing through a heat exchanger can be contaminated by small, inconsequential amounts of the other and/or their reaction products. As used herein and in the claims, therefore, "substantially isolated" means that the isolation is either total or it only inconsequentially deviates from total isolation.

In a loop (usually the outer loop) which includes one or more compressors, it is difficult to prevent contamination of the heat transfer fluid circulating through the loop by lubricant from the compressor(s). Over a period of time the contamination can build up to a level at which it is no longer inconsequential. Although the heat transfer fluid in a single-loop system might be unreactive with molecular chlorine, the lubricant can be unless expensive unreactive lubricant is used. For this reason single-loop systems are disadvantageous even where unreactive heat transfer fluid is used. By using two loops, the degree of isolation of the compressor lubricant and the molecular chlorine can be very considerably increased in the event of small imperfections. By using three or more loops, the degree of isolation can be increased even more. An embodiment of the invention, therefore, is the process as above described wherein heat is transferred from the third heat transfer fluid to a fourth heat transfer fluid wherein the fourth heat transfer fluid is substantially isolated from the molecular chlorine, from the first heat transfer fluid, from the second heat transfer fluid, and from the third heat transfer fluid. In most instances the third heat transfer fluid passes through a third loop.

In a second embodiment of the invention, a process for liquefying chlorine comprises: (a) transferring latent heat from gaseous molecular chlorine to a first heat transfer fluid passing through a first loop, wherein the first heat transfer fluid is substantially isolated from the molecular chlorine; (b) transferring heat from the first heat transfer fluid to a second heat transfer fluid passing through a second loop, wherein the second heat transfer fluid is substantially isolated from the molecular chlorine and from the first heat transfer fluid; (c) transferring heat from the second heat transfer fluid to a third heat transfer fluid passing through a third loop, wherein the third heat transfer fluid is substantially isolated from the molecular chlorine, from the first heat transfer fluid, and from the second heat transfer fluid; and (d) transferring heat from the third heat transfer fluid to a fourth heat transfer fluid wherein the fourth heat transfer fluid is substantially isolated from the molecular chlorine, from the first heat transfer fluid, from the second heat transfer fluid, and from the third heat transfer fluid; wherein the first heat transfer fluid is selected from the group consisting of: (e) at least one perhalogenated methane represented by the formula $CCl_{(4-i)}F_i$ where i is 1, 2, 3, or 4; (f) at least one perhalogenated ethane represented by the formula $C_2Cl_{(6-j)}F_j$ where j is 3, 4, 5, or 6; (g) at least one perhalogenated propane represented by the formula $C_3Cl_{(8-k)}F_k$ where k is 4, 5, 6, 7, or 8; (h) at least one halogenated ethane represented by the formula $C_2HCl_{(5-x)}F_x$ where x is 3, 4, or 5; (i) at least one halogenated propane represented by the formula $C_3HCl_{(7-y)}F_y$ where y is 4, 5, 6, or 7; (j) at least one perfluorinated normal alkane containing from 4 to 8 carbon atoms; (k) at least one perhalogenated cyclobutane represented by the formula $C_4Cl_{(8-z)}F_z$ where z is 6, 7, or 8; (l) perfluoro-1,3-dimethylcyclohexane [CAS 335-27-3]; (m) perfluoro(methyldecalin) [CAS 51294-16-7]; (n) carbon dioxide; and (o) a mixture thereof.

In general, the heat transfer fluids used in the loops of the chlorine liquefaction process should have melting points below the lowest temperature employed in the chlorine liquefaction process. The last heat transfer fluid which removes heat of compression due to compression by the compressor(s) may have a higher or lower melting point as desired. The boiling points the heat transfer fluids used in the loops of the chlorine liquefaction process under the conditions of use can be either above or below the lowest temperature employed in the chlorine liquefaction process. It is preferred that the boiling point of at least the first heat transfer fluid be below the lowest temperature employed in the chlorine liquefaction process so that most of the heat transferred to and from the first heat transfer fluid can be latent heat. Nevertheless transfer of most of the heat as sensible heat is within contemplation.

It will be appreciated that the temperature of the first heat transfer fluid must be lower than that of the condensing molecular chlorine in order for there to be a driving force for the transfer of heat from the chlorine to the first heat transfer fluid. Similarly, the temperature of each heat transfer fluid to which heat is transferred must be lower than that of the heat transfer fluid from which heat is transferred.

Perhalogenated methanes that can be used as the first heat transfer fluid include perfluoromethane, chlorotrifluoromethane, dichlorodifluoromethane, and trichlorofluoromethane.

Perhalogenated ethanes that can be used as the first heat transfer fluid include perfluoroethane, is chloropentafluoroethane, 1,1-dichloro-1,2,2,2-tetrafluoroethane, 1,2-dichloro-1,1,2,2-dichlorofluoroethane, 1,1,1-trichloro-2,2,2-trifluoroethane, and 1,1,2-trichloro- 1,2,2-trifluoroethane.

Perhalogenated propanes that can be used as the first heat transfer fluid include perfluoropropane (also known as octafluoropropane)[CAS 76-19-7], 1-chloro-1,1,2,2,3,3,3-heptafluoropropane, 2-chloro-1,1,1,2,3,3,3-heptafluoropropane, 1,1-dichloro-1,2,2,3,3,3-hexafluoropropane, 1,2-dichloro- 1,1,2,3,3,3-hexafluoropropane, 1,3-dichloro-1,1,2,2,3,3-hexafluoropropane, 1,1,1-trichloro-2,2,3,3,3-pentafluoropropane, 1,1,2-trichloro-1,2,3,3,3-pentafluoropropane, 1,1,3-trichloro-1,2,2,3,3-pentafluoropropane, 1,2,3-trichloro-1,1,2,3,3-pentafluoropropane, 1,1,1,2-tetrachloro-2,3,3,3-tetrafluoropropane, 1,1,1,2-tetrachloro-2,3,3,3-tetrafluoropropane, 1,1,1,3-tetrachloro-2,2,3,3-tetrafluoropropane, 1,1,2,2-tetrachloro-1,3,3,3-tetrafluoropropane, 1,1,2,3-tetrachloro-1,2,3,3-tetrafluoropropane, 1,1,3,3-tetrachloro-1,2,2,3-tetrafluoropropane, and 1,2,2,3-tetrachloro-1,1,3,3-tetrafluoropropane.

Halogenated ethanes containing one hydrogen that can be used include pentafluoroethane, 1-chloro-1,1,2,2-tetrafluoroethane, 1-chloro-1,2,2,2,-tetrafluoroethane, 1,2-dichloro-1,2,2-trifluroethane, 1,2-dichloro-1,1,2-trifluoroethane, and 1,1-dichloro-2,2,2-trifluoroethane.

Halogenated propanes containing one hydrogen that can be used as the first heat transfer fluid include 1,1,1,2,2,3,3,-heptafluoropropane, 1,1,1,2,3,3,3-heptafluoropropane, 1-chloro-1,2,2,3,3,3-hexafluoropropane, 2-chloro- 1,1,1,2,3,3-hexafluoropropane, 1-chloro-1,1,2,2,3,3-hexafluoropropane, 1-chloro-1,1,2,3,3,3-hexafluoropropane, 2-chloro-1,1,1,3,3,3-hexafluoropropane, 1,1-dichloro-1,2,2,3,3-pentafluoropropane, 1,2-dichloro-1,1,2,3,3-pentafluoropropane, 2,2-dichloro-1,1,1,3,3-pentafluoropropane, 1,3-dichloro-1,1,2,2,3-pentafluoropropane, 1,2-dichloro-1,2,3,3,3-pentafluoropropane, 1,1-dichloro-2,2,3,3,3-pentafluoropropane, 1,1-dichloro-1,2,3,3,3-pentafluoropropane, 1,2-dichloro-1,1,3,3,3-pentafluoropropane, 1,3-dichloro-1,1,2,3,3-pentafluoropropane, 1,1,2-trichloro-2,3,3,3-tetrafluoropropane, 1,1,3-trichloro-2,2,3,3-tetrafluoropropane, 1,2,2-trichloro-1,3,3,3-tetrafluoropropane, 1,2,3-trichloro-1,1,2,3-tetrafluoropropane, 1,2,2,-trichloro-1,1,3,3-tetrafluoropropane, 1,1,3-trichloro-1,2,2,3-tetrafluoropropane, 1,1,1-trichloro-2,2,3,3-tetrafluoropropane, 1,1,2-trichloro-1,2,3,3-tetrafluoropropane, 1,1,1-trichloro-2,3,3,3-tetrafluoropropane, 1,1,2-trichloro-1,3,3,3-tetrafluoropropane, 1,1,3-trichloro-1,2,3,3-tetrafluoropropane, and 1,2,3-trichloro-1,1,3,3-tetrafluoropropane.

One preferred first heat transfer fluid comprises perfluoropropane. The amount of perfluoropropane constituting the preferred heat transfer fluid can vary widely. When perfluoropropane is used, it ordinarily constitutes from 40 to 100 percent by weight of the first heat transfer fluid. Often perfluoropropane constitutes from 60 to 100 percent by weight of the first heat transfer fluid. From 95 to 100 percent by weight is especially preferred.

Another preferred first heat transfer fluid comprises carbon dioxide. When carbon dioxide is used, it preferably, but not necessarily, constitutes 100 percent of the first heat transfer fluid.

Heat transfer fluids in loops other than the first loop can be the same as the first heat transfer fluid or they can be different. They can themselves be the same, they can be different, or some may be the same but different from others. These higher order (i.e., second, third, fourth, etc.) heat transfer fluids can be unreactive with molecular chlorine or some or all may be reactive with molecular chlorine. Any of the heat transfer fluids described above in respect of the first heat transfer fluid may be employed as higher order heat transfer fluids. Other suitable higher order heat transfer fluids include carbon tetrachloride, methylene chloride, chlorofluoromethane, methylene fluoride, methyl chloride, methyl fluoride, 1,2,-dibromo-1,1,2,2-tetrafluoroethane, 1,1,1,2-tetrafluoroethane, 1-chloro-2,2,2-trifluoroethane, 1-chloro-1,1-difluoroethane, 1,1,1-trifluoroethane, 1,1-difluoroethane, ethyl chloride, ammonia, sulfur dioxide, propane, aqueous sodium chloride solution, aqueous sodium sulfate solution, and aqueous calcium chloride solution. This listing of suitable heat transfer fluids is not exhaustive and others may be used as desired. Mixtures of heat transfer fluids may be used when desired.

Although the above discussion has been in respect of the liquefaction of molecular chlorine, the principles are applicable to the liquefaction of many other substances as well, such as for example, molecular bromine, hydrogen fluoride, hydrogen chloride, and hydrogen bromide.

Therefore, another embodiment of the invention is a process for liquifying a substance comprising: (a) transferring latent heat from the substance in the gaseous state to a first heat transfer fluid passing through a first loop wherein the first heat transfer fluid is substantially isolated from the substance; (b) transferring heat from the first heat transfer fluid to a second heat transfer fluid passing through a second loop wherein the second heat transfer fluid is substantially isolated from the substance and from the first heat transfer fluid; and (c) transferring heat from the second heat transfer fluid to a third heat transfer fluid wherein the third heat transfer fluid is substantially isolated from the substance, from the first heat transfer fluid, and from the second heat transfer fluid; wherein the first heat transfer fluid is selected from the group consisting of: (d) at least one perhalogenated methane represented by the formula $CCl_{(4-i)}F_i$ where i is 1, 2, 3, or 4; (e) at least one perhalogenated ethane represented by the formula $C_2Cl_{(6-j)}F_j$ where j is 3, 4, 5, or 6; (f) at least one perhalogenated propane represented by the formula $C_3Cl_{(8-k)}F_k$ where k is 4, 5, 6, 7, or 8; (g) at least one halogenated ethane represented by the formula $C_2HCl_{(5-x)}F_x$ where x is 3, 4, or 5; (h) at least one halogenated propane represented by the formula $C_3HCl_{(7-y)}F_y$ where y is 4, 5, 6, or 7; (i) at least one perfluorinated normal alkane containing from 4 to 8 carbon atoms; (j) at least one perhalogenated cyclobutane represented by the formula $C_4Cl_{(8-z)}F_z$ where z is 6, 7, or 8; (k) perfluoro-1,3-dimethylcyclohexane; (l) perfluoro(methyldecalin); (m) carbon dioxide; and (n) a mixture thereof.

Yet another embodiment of the invention is a process for liquifying a substance comprising: (a) transferring latent heat from the substance in the gaseous state to a first heat transfer fluid passing through a first loop wherein the first heat transfer fluid is substantially isolated from the substance; (b) transferring heat from the first heat transfer fluid to a second heat transfer fluid passing through a second loop wherein the second heat transfer fluid is substantially isolated from the substance and from the first heat transfer fluid; (c) transferring heat from the second heat transfer fluid to a third heat transfer fluid passing through a third loop wherein the third heat transfer fluid is substantially isolated from the substance, from the first heat transfer fluid, and from the second heat transfer fluid; and (d) transferring heat from the third heat transfer fluid to a fourth heat transfer fluid wherein the fourth heat transfer fluid is substantially isolated from the substance, from the first heat transfer fluid, from the second heat transfer fluid, and from the third heat transfer fluid; wherein the first heat transfer fluid is selected from the group consisting of: (e) at least one perhalogenated methane represented by the formula $CCl_{(4-i)}F_i$ where i is 1, 2, 3, or 4; (f) at least one perhalogenated ethane represented by the formula $C_2Cl_{(6-j)}F_j$ where j is 3, 4, 5, or 6; (g) at least one perhalogenated propane represented by the formula $C_3Cl_{(8-k)}F_k$ where k is 4, 5, 6, 7, or 8; (h) at least one halogenated ethane represented by the formula $C_2HCl_{(5-x)}F_x$ where x is 3, 4, or 5; (i) at least one halogenated propane represented by the formula $C_3HCl_{(7-y)}F_y$ where y is 4, 5, 6, or 7; (j) at least one perfluorinated normal alkane containing from 4 to 8 carbon atoms; (k) at least one perhalogenated cyclobutane represented by the formula $C_4Cl_{(8-z)}F_z$ where z is 6, 7, or 8; (l) perfluoro-1,3-dimethylcyclohexane; (m) perfluoro(methyldecalin); (n) carbon dioxide; and (o) a mixture thereof.

DESCRIPTION OF THE DRAWINGS

For a better understanding of the invention, reference may be made to the drawings wherein like numerals refer to like parts and in which:

FIG. 3 shows diagrammatically one form of construction which can be used in the embodiments of FIG. 1 and FIG. 2; and FIG. 4 shows diagrammatically an end view taken on line 4—4 of FIG. 3.

Figure 1:
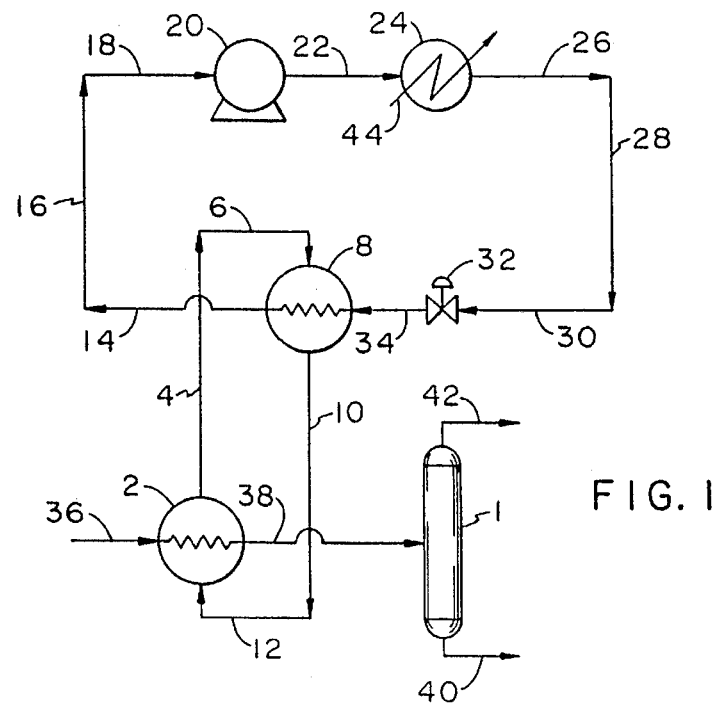
FIG. 1 shows diagrammatically an embodiment of the invention.

Referring now in detail to the drawings, there is shown diagrammatically in FIG. 1 a chlorine liquefaction system comprising phase separator 1, a first loop, and a second loop. The phase separator can be a part of the condenser or it can be separate as shown. The first loop comprises condenser 2 (shell side), line 4, line 6, heat exchanger 8 (shell side), line 10, and line 12. The second loop comprises heat exchanger 8 (tube side), line 14, line 16, line 18, compressor 20, line 22, heat exchanger 24 (shell side), line 26, line 28, line 30, expansion valve 32, and line 34. In operation, first heat transfer fluid passes through the first loop and second heat transfer fluid passes through the second loop. Gaseous molecular chlorine is introduced through line 36 to the tube side of condenser 2 where latent heat is transferred from the gaseous molecular chlorine to first heat transfer fluid passing through the shell side of condenser 2. Sensible heat may optionally also be transferred from the molecular chlorine to the first heat transfer fluid in condenser 2. Liquid chlorine and some uncondensed gaseous materials pass through line 38 to phase separator 1. Liquid chlorine is removed from phase separator 1 through line 40 and uncondensed gaseous materials are removed through line 42. Heat is transferred from the first heat transfer fluid to the second heat transfer fluid in heat exchanger 8. Gaseous second heat transfer fluid passes from the tube side of heat exchanger 8 through lines 14, 16, and 18 to compressor 20 where it is compressed. The compressed gaseous second heat transfer fluid passes through line 22 to the shell side of heat exchanger 24 where heat is transferred from the second heat transfer fluid to third heat transfer fluid passing through line 44 and the tube side of heat exchanger 24. The cooled second heat transfer fluid then passes through lines 26, 28, and 30 to expansion valve 32. In passing through expansion valve 32 the pressure of the second heat transfer fluid is reduced thereby resulting in further cooling of the second heat transfer fluid. The cold second heat transfer fluid then passes through line 34 to the tube side of heat exchanger 8 where it receives heat transferred from the first heat transfer fluid passing through the shell side of heat exchanger 8.

The first heat transfer fluid can remain in the gaseous phase or in the liquid phase as it passes through the first loop. The temperature difference between the condensing molecular chlorine and the first heat transfer fluid can vary considerably, but usually it is in the range of from 4 to 20 Celsius degrees. Often the temperature difference is in the range of from 5 to 15 Celsius degrees. From 6 to 10 Celsius degrees is preferred. The temperature difference between the first heat transfer fluid and the second heat transfer fluid can also vary considerably, but usually it is in the range of from 4 to 20 Celsius degrees. Often the temperature difference is in the range of from 5 to 15 Celsius degrees. From 6 to 10 Celsius degrees is preferred.

In a preferred embodiment the gaseous first heat transfer fluid passing through heat exchanger 8 is at least partially liquefied by transfer of heat from the first heat transfer fluid to the second heat transfer fluid in heat exchanger 8, and liquid first heat transfer fluid is at least partially vaporized by transfer of heat from molecular chlorine in condenser 2. In this preferred embodiment, heat is transferred in condenser 2 from the condensing chlorine to the vaporizing first heat transfer fluid and heat is transferred in heat exchanger 8 from condensing first heat transfer fluid to the second heat transfer fluid. Pressures are maintained such that the boiling point of the first heat transfer fluid under its prevailing pressure is several Celsius degrees below the boiling point of the chlorine under its prevailing pressure. This temperature difference provides the driving force to transfer heat from the condensing chlorine to the vaporizing first heat transfer fluid. The temperature difference can vary considerably, but usually it is in the range of from 4 to 20 Celsius degrees. Often the temperature difference is in the range of from 5 to 15 Celsius degrees. From 6 to 10 Celsius degrees is preferred. Pressures are also maintained such that the temperature of the second heat transfer fluid is several Celsius degrees lower than the boiling point of the first heat transfer fluid under its prevailing pressure. This temperature difference provides the driving force to transfer heat from the condensing first heat transfer fluid to the second heat transfer fluid. The temperature difference can vary considerably, but usually it is in the range of from 4 to 20 Celsius degrees. Often the temperature difference is in the range of from 5 to 15 Celsius degrees. From 6 to 10 Celsius degrees is preferred.

In the preferred embodiment, a mechanical pump may be used to circulate first heat transfer fluid through the first loop. It is further preferred, however, to locate heat exchanger 8 at a physically higher elevation than condenser 2. When this is done the weight of first heat transfer fluid in line 10 (which includes a large proportion of liquid) will exceed the weight of first heat transfer fluid in line 4 (which comprises a large proportion of vapor and little or no liquid) such that circulation is maintained by convection without need of a mechanical pump.

The second heat transfer fluid can remain in the gaseous phase as it passes through the second loop.

In a preferred embodiment liquid second heat transfer fluid passing through heat exchanger 8 is vaporized by transfer of heat from the first heat transfer fluid to the second heat transfer fluid and heat is transferred in heat exchanger 24 from condensing second heat transfer fluid to the third heat transfer fluid. The pressure is maintained such that the boiling point of the second heat transfer fluid under its prevailing pressure is several Celsius degrees below the temperature of the first heat transfer fluid. The temperature difference between the vaporizing second heat transfer fluid and the first heat transfer fluid can vary considerably, but usually it is in the range of from 4 to 20 Celsius degrees. Often the temperature difference is in the range of from 5 to 15 Celsius degrees. From 6 to 10 Celsius degrees is preferred. Gaseous second heat transfer fluid passing through heat exchanger 24 is at least partially liquefied by transfer of heat from the second heat transfer fluid to the third heat transfer fluid in heat exchanger 24. The temperature of the third heat transfer fluid is several Celsius degrees below the boiling point of the condensing second heat transfer fluid under its prevailing pressure in heat exchanger 24. The temperature difference can vary considerably, but usually it is in the range of from 4 to 20 Celsius degrees. Often the temperature difference is in the range of from 5 to 15 Celsius degrees. From 6 to 10 Celsius degrees is preferred. The liquid second heat transfer fluid then undergoes a reduction in pressure during passage through expansion valve 32 where a portion of the liquid is flashed to vapor and the temperature of the second heat transfer fluid is reduced. Cold second heat transfer fluid then passes through line 34 to the tube side of heat exchanger 8. Liquid second heat transfer fluid is vaporized during its passage through heat exchanger 8 by absorption of heat transferred from the first heat transfer fluid.

In a particularly preferred embodiment liquid second heat transfer fluid passing through heat exchanger 8 is vaporized by transfer of heat from condensing first heat transfer fluid in heat exchanger 8. The pressures are maintained such that the boiling point of the second heat transfer fluid under its prevailing pressure is several Celsius degrees below the boiling point of the first heat transfer fluid under its prevailing pressure. The temperature difference between the vaporizing second heat transfer fluid and the condensing first heat transfer fluid can vary considerably, but usually it is in the range of from 4 to 20 Celsius degrees. Often the temperature difference is in the range of from 5 to 15 Celsius degrees. From 6 to 10 Celsius degrees is preferred. The liquid second heat transfer fluid then undergoes a reduction in pressure during passage through expansion valve 32 where a portion of the liquid is flashed to vapor and the temperature of the second heat transfer fluid is reduced. Cold second heat transfer fluid then passes through line 34 to the tube side of heat exchanger 8. Liquid second heat transfer fluid is vaporized during its passage through heat exchanger 8 by absorption of heat transferred from condensing first heat transfer fluid.

The third heat transfer fluid passing through line 44 and the tube side of heat exchanger 24 can be virtually any liquid or gaseous heat transfer fluid. In most instances, however, the third heat transfer fluid is water. The temperature of the third heat transfer fluid is several Celsius degrees below the temperature of the second heat transfer fluid in heat exchanger 24. The temperature difference can vary considerably, but usually it is in the range of from 4 to 20 Celsius degrees. Often the temperature difference is in the range of from 5 to 15 Celsius degrees. From 6 to 10 Celsius degrees is preferred.

It will be recognized that the second loop is a conventional vapor compression refrigeration system.

Figure 2:
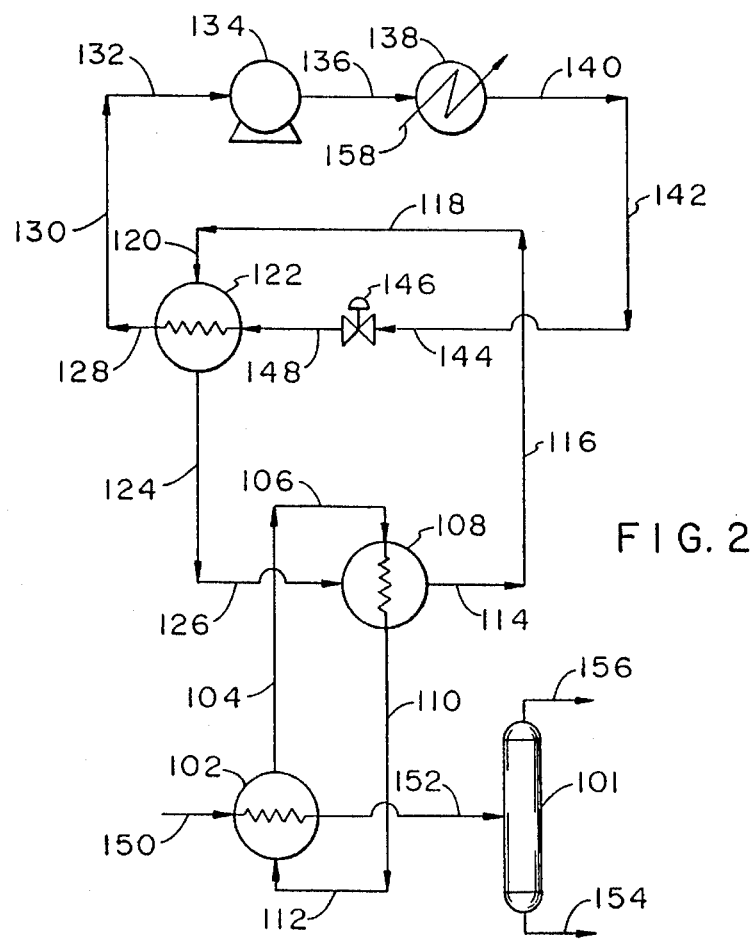
FIG. 2 shows diagrammatically a second embodiment of the invention.

In FIG. 2 there is shown diagrammatically a chlorine liquefaction system comprising phase separator 101, a first loop, a second loop, and a third loop. The first loop comprises condenser 102 (shell side), line 104, line 106, heat exchanger 108 (tube side), line 110, and line 112. The second loop comprises condenser 108 (shell side), line 114, line 116, line 118, line 120, heat exchanger 122 (shell side), line 124, and line 126. The third loop comprises heat exchanger 122 (tube side), line 128, line 130, line 132, compressor 134, line 136, heat exchanger 138 (shell side), line 140, line 142, line 144, expansion valve 146, and line 148. In operation, first heat transfer fluid passes through the first loop, second heat transfer fluid passes through the second loop, and third heat transfer fluid passes through the third loop. Gaseous molecular chlorine is introduced through line 150 to the tube side of condenser 102 where latent heat is transferred from the gaseous molecular chlorine to first heat transfer fluid passing through the shell side of condenser 102. Liquid chlorine and some uncondensed gaseous materials pass through line 152 to phase separator 101. Liquid chlorine is removed from phase separator 101 through line 154 and uncondensed gaseous materials are removed through line 156. Heat is transferred from the first heat transfer fluid to the second heat transfer fluid in heat exchanger 108. Heat is transferred from the second heat transfer fluid to the third heat transfer fluid in heat exchanger 122. Gaseous third heat transfer fluid passes from the tube side of heat exchanger 122 through lines 128, 130, and 132 to compressor 134 where it is compressed. The compressed gaseous third heat transfer fluid passes through line 136 to the shell side of heat exchanger 138 where heat is transferred from the third heat transfer fluid to fourth heat transfer fluid passing through line 158 and the tube side of heat exchanger 138. The cooled third heat transfer fluid then passes through lines 140, 142, and 144 to expansion valve 146. In passing through expansion valve 146 the pressure of the third heat transfer fluid is reduced thereby resulting in further cooling of the third heat transfer fluid. The cold third heat transfer fluid then passes through line 148 to the tube side of heat exchanger 122 where it receives heat transferred from the second heat transfer fluid passing through the shell side of heat exchanger 122.

As in FIG. 1, the first heat transfer fluid passing through the first loop of FIG. 2 can remain in the gaseous phase or in the liquid phase. The temperature difference between the condensing molecular chlorine and the first heat transfer fluid can vary considerably, but usually it is in the range of from 4 to 20 Celsius degrees. Often the temperature difference is in the range of from 5 to 15 Celsius degrees. From 6 to 10 Celsius degrees is preferred. The temperature difference between the first heat transfer fluid and the second heat transfer fluid can also vary considerably, but usually it is in the range of from 4 to 20 Celsius degrees. Often the temperature difference is in the range of from 5 to 15 Celsius degrees. From 6 to 10 Celsius degrees is preferred.

In a preferred embodiment the gaseous first heat transfer fluid passing through heat exchanger 108 is at least partially liquefied by transfer of heat from the first heat transfer fluid to the second heat transfer fluid in heat exchanger 108, and liquid first heat transfer fluid is at least partially vaporized by transfer of heat from molecular chlorine in condenser 102. In this preferred embodiment, heat is transferred in condenser 102 from the condensing chlorine to the vaporizing first heat transfer fluid and heat is transferred in heat exchanger 108 from condensing first heat transfer fluid to the second heat transfer fluid. Pressures are maintained such that the boiling point of the first heat transfer fluid under its prevailing pressure is several Celsius degrees below the boiling point of the chlorine under its prevailing pressure. This temperature difference provides the driving force to transfer heat from the condensing chlorine to the vaporizing first heat transfer fluid. The temperature difference can vary considerably, but usually it is in the range of from 4 to 20 Celsius degrees. Often the temperature difference is in the range of from 5 to 15 Celsius degrees. From 6 to 10 Celsius degrees is preferred. Pressures are also maintained such that the temperature of the second heat transfer fluid is several Celsius degrees lower than the boiling point of the first heat transfer fluid under its prevailing pressure. This temperature difference provides the driving force to transfer heat from the condensing first heat transfer fluid to the second heat transfer fluid. The temperature difference can vary considerably, but usually it is in the range of from 4 to 20 Celsius degrees. Often the temperature difference is in the range of from 5 to 15 Celsius degrees. From 6 to 10 Celsius degrees is preferred.

In the preferred embodiment, a mechanical pump may be used to circulate first heat transfer fluid through the first loop. It is further preferred, however, to locate heat exchanger 108 at a physically higher elevation than condenser 102. When this is done the weight of first heat transfer fluid in line 110 (which includes a large proportion of liquid) will exceed the weight of first heat transfer fluid in line 104 (which comprises a large proportion of vapor and little or no liquid) such that circulation is maintained by convection without need of a mechanical pump for the reasons discussed in respect of FIG. 1.

The second heat transfer fluid can remain in the gaseous phase or in the liquid phase as it passes through the second loop. Alternatively, liquid second heat transfer fluid passing through heat exchanger 108 is vaporized by transfer of heat from the first heat transfer fluid to the second heat transfer fluid and heat is transferred in heat exchanger 122 from condensing second heat transfer fluid to the third heat transfer fluid. The pressure is maintained such that the boiling point of the second heat transfer fluid under its prevailing pressure is several Celsius degrees below the temperature of the first heat transfer fluid. The temperature difference between the vaporizing second heat transfer fluid and the first heat transfer fluid can vary considerably, but usually it is in the range of from 4 to 20 Celsius degrees. Often the temperature difference is in the range of from 5 to 15 Celsius degrees. From 6 to 10 Celsius degrees is preferred. Gaseous second heat transfer fluid passing through heat exchanger 122 is at least partially liquefied by transfer of heat from the second heat transfer fluid to the third heat transfer fluid in heat exchanger 122. The temperature of the third heat transfer fluid is several Celsius degrees below the boiling point of the condensing second heat transfer fluid under its prevailing pressure in heat exchanger 122. The temperature difference can vary considerably, but usually it is in the range of from 4 to 20 Celsius degrees. Often the temperature difference is in the range of from 5 to 15 Celsius degrees. From 6 to 10 Celsius degrees is preferred. Heat exchanger 122 may be located at a physically higher elevation than heat exchanger 108 such that circulation is maintained by convection without the need for a mechanical pump.

It is preferred, however that the second heat transfer fluid circulating through the second loop of FIG. 2 remain in the liquid phase. It is further preferred that the second heat transfer fluid be aqueous calcium chloride solution. Reasons for this preference are low cost and high heat capacity. It is also advantageous to store cold second heat transfer fluid in a surge tank (not shown) so that chlorine liquefaction can continue for a reasonable period of time upon interruption of the refrigeration normally provided by system of the third loop; aqueous calcium chloride solution is admirably suited for this purpose.

The third heat transfer fluid can remain in the gaseous phase as it passes through the third loop.

In a preferred embodiment liquid third heat transfer fluid passing through heat exchanger 122 is vaporized by transfer of heat from the second heat transfer fluid to the third heat transfer fluid and heat is transferred in heat exchanger 138 from condensing third heat transfer fluid to the fourth heat transfer fluid. The pressure is maintained such that the boiling point of the third heat transfer fluid under its prevailing pressure is several Celsius degrees below the temperature of the second heat transfer fluid. The temperature difference between the vaporizing third heat transfer fluid and the second heat transfer fluid can vary considerably, but usually it is in the range of from 4 to 20 Celsius degrees. Often the temperature difference is in the range of from 5 to 15 Celsius degrees. From 6 to 10 Celsius degrees is preferred. Gaseous third heat transfer fluid passing through heat exchanger 138 is at least partially liquefied by transfer of heat from the third heat transfer fluid to the fourth heat transfer fluid in heat exchanger 138. The temperature of the fourth heat transfer fluid is several Celsius degrees below the boiling point of the condensing third heat transfer fluid under its prevailing pressure in heat exchanger 138. The temperature difference can vary considerably, but usually it is in the range of from 4 to 20 Celsius degrees. Often the temperature difference is in the range of from 5 to 15 Celsius degrees. From 6 to 10 Celsius degrees is preferred. The liquid third heat transfer fluid then undergoes a reduction in pressure during passage through expansion valve 146 where a portion of the liquid is flashed to vapor and the temperature of the third heat transfer fluid is reduced. Cold second heat transfer fluid then passes through line 148 to the tube side of heat exchanger 122. Liquid third heat transfer fluid is vaporized during its passage through heat exchanger 122 by absorption of heat transferred from the second heat transfer fluid.

The fourth heat transfer fluid passing through line 158 and the tube side of heat exchanger 138 can be virtually any liquid or gaseous heat transfer fluid. In most instances, however, the fourth heat transfer fluid is water. The temperature of the fourth heat transfer fluid is several Celsius degrees below the temperature of the third heat transfer fluid in heat exchanger 138. The temperature difference can vary considerably, but usually it is in the range of from 4 to 20 Celsius degrees. Often the temperature difference is in the range of from 5 to 15 Celsius degrees. From 6 to 10 Celsius degrees is preferred.

It will be recognized that the third loop is a conventional vapor compression refrigeration system.

In FIG. 3 and FIG. 4 there are shown diagrammatically an apparatus which can be used instead of the separate phase separator 1, condenser 2, and heat exchanger 8 of FIG. 1, or the separate phase separator 101, condenser 102, and heat exchanger 108 of FIG. 2. The apparatus comprises condenser 202 and heat exchanger 204 joined by several large pipes 206 and several small pipes 208. Condenser 202 has a single shell-side pass and two tube-side passes and comprises shell 210, tubes, not shown, and head 212 having inlet 214, liquid outlet 216 and vapor outlet 218. A baffle, not shown, within head 212 separates the entering and leaving tube-side streams in a conventional manner. Heat exchanger 204 has a single shell-side pass and a single tube-side pass and comprises shell 220, tubes, not shown, head 222 having inlet 224, and head 226 having outlet 228. Large pipes 206 extend upwardly a few centimeters beyond the inner surface of shell 220. The upper ends of small pipes 208 are substantially flush with the inner surface of shell 220. Except for the addition of large pipes 206 and small pipes 208, the constructions of condenser 202 and heat exchanger 204 are conventional and well known. In operation, gaseous molecular chlorine is introduced through inlet 214 to the tube side of condenser 202 where latent heat is transferred from the gaseous molecular chlorine to vaporizing first heat transfer fluid passing through the shell side of condenser 202. Sensible heat may optionally also be transferred from the molecular chlorine to the first heat transfer fluid in condenser 202. Liquid chlorine is removed through liquid outlet 216 and uncondensed gaseous materials are removed through vapor outlet 218. Second heat transfer fluid is introduced through inlet 224 to the tube side of heat exchanger 204. Heat is transferred from condensing first heat transfer fluid passing through the shell side of heat exchanger 204 to the second heat transfer fluid passing through the tube side of heat exchanger 204. Heated second heat transfer fluid is removed through outlet 228. The diameters and numbers of large pipes 206 are such that first heat transfer vapor can freely pass upwardly through them from condenser 202 to heat exchanger 204. The diameters and numbers of small pipes 208 are such that first heat transfer liquid can freely pass downwardly through them from heat exchanger 204 to condenser 202. Some first heat transfer liquid may also pass downwardly through large pipes 206. It is preferred to operate the system such that liquid second heat transfer fluid is vaporized while passing through the tube-side of heat exchanger 204. It is also within contemplation to operate the system such that there is no phase change of second heat transfer fluid while passing through the tube-side of heat exchanger 204.

For the sake of clarity in setting forth the nature of the invention, parts of the apparatus such as valves, pumps, flow indicators, pressure indicators, temperature indicators, pressure relief valves, hold-up tanks, storage tanks, flange bolts, welds, and the like, not essential to a complete understanding of the invention, have been omitted from the drawings.

It will be appreciated that various modifications can be made to the systems of the drawings without departing from the spirit of the invention. For example, expansion valves can be replaced with expansion engines from which work is obtained. Similarly, the shell sides and tube sides of condensers and heat exchangers can be exchanged. More than three loops can be used. Heat exchangers (including condensers) connected in parallel and/or series can be used instead of a single heat exchanger. Compressors connected in parallel and/or series can be used instead of a single compressor. In FIG. 3 and FIG. 4, shell 210, large pipes 206, small pipes 208, and shell 220 can be replaced by a single shell enclosing the tubes of both condenser 202 and heat exchanger 204. These modifications are only exemplary, and many others can be made.

The invention is further described in conjunction with the following example which is to be considered illustrative rather than limiting, and in which all parts are parts by weight and all percentages are percentages by weight unless otherwise specified.

EXAMPLE

A process for liquifying gaseous molecular chlorine in accordance with the present invention will now be described in tabular form in the following Table 1 and Table 2 in which references to lines are made in respect of FIG. 1. In the interest of brevity, compositions are identified by the line numbers in which they flow. Small pressure drops through the equipment due to friction have been ignored.

TABLE 1

| | Chlorine Stream | | | |
|---|---|---|---|---|
| Line No. | 36 | 38 | 40 | 42 |
| Flow Rate, parts/hour | | | | |
| $Cl_2$ | 187.3 | 187.3 | 183.3 | 4.0 |
| $O_2$ | 1.2 | 1.2 | 0.3 | 0.9 |
| $CO_2$ | 0.6 | 0.6 | 0.5 | 0.1 |
| Temperature, °C | 38 | −7 | −7 | −7 |
| Pressure, kPa, gauge | 379 | 379 | 379 | 379 |
| Vapor Fraction, wt/wt | 1 | 0.0264 | 0 | 1 |

TABLE 2

| | Heat Transfer Fluid Streams | | | |
|---|---|---|---|---|
| Line No. | 4 | 10 | 16 | 34 |
| Flow Rate, parts/hour | | | | |
| $C_3F_8$ | 529.4 | 529.4 | 0 | 0 |
| $1,1,1,2-C_2H_2F_4$ | 0 | 0 | 253.4 | 253.4 |
| Temperature, °C | −15 | −16 | −23 | −23 |
| Pressure, kPa, gauge | 138 | 138 | 11 | 11 |
| Vapor Fraction, wt/wt | 1 | 0 | 1 | ~0 |

Although the present invention has been described with reference to specific details of certain embodiments thereof, it is not intended that such details should be regarded as limitations upon the scope of the invention except insofar as they are included in the accompanying claims.

We claim:

1. A process for liquifying a substance comprising:

(a) transferring latent heat from said substance in the gaseous state to a first heat transfer fluid passing through a first loop wherein said first heat transfer fluid is substantially isolated from said substance;

(b) transferring heat from said first heat transfer fluid to a second heat transfer fluid passing through a second loop wherein said second heat transfer fluid is substantially isolated from said substance and from said first heat transfer fluid; and (c) transferring heat from said second heat transfer fluid to a third heat transfer fluid wherein said third heat transfer fluid is substantially isolated from said substance, from said first heat transfer fluid, and from said second heat transfer fluid;

wherein said first heat transfer fluid is selected from the group consisting of:

(d) at least one perhalogenated methane represented by the formula $CCl_{(4-i)}F_i$ where i is 1, 2, 3, or 4;

(e) at least one perhalogenated ethane represented by the formula $C_2Cl_{(6-j)}F_j$ where j is 3, 4, 5, or 6;

(f) at least one perhalogenated propane represented by the formula $C_3Cl_{(8-k)}F_k$ where k is 4, 5, 6, 7, or 8;

(g) at least one halogenated ethane represented by the formula $C_2HCl_{(5-x)}F_x$ where x is 3, 4, or 5;

(h) at least one halogenated propane represented by the formula $C_3HCl_{(7-y)}F_y$ where y is 4, 5, 6, or 7;

(i) at least one perfluorinated normal alkane containing from 4 to 8 carbon atoms;

(j) at least one perhalogenated cyclobutane represented by the formula $C_4Cl_{(8-z)}F_z$ where z is 6, 7, or 8;

(k) perfluoro-1,3-dimethylcyclohexane;

(l) perfluoro(methyldecalin);

(m) carbon dioxide; and (n) a mixture thereof, and wherein said substance is selected from the group consisting of:

(o) molecular chlorine, (p) molecular bromine, (q) hydrogen fluoride, (r) hydrogen chloride, and (s) hydrogen bromide.

2. A process for liquifying molecular chlorine comprising:

(a) transferring latent heat from gaseous molecular chlorine to a first heat transfer fluid passing through a first loop wherein said first heat transfer fluid is substantially isolated from said molecular chlorine;

(b) transferring heat from said first heat transfer fluid to a second heat transfer fluid passing through a second loop wherein said second heat transfer fluid is substantially isolated from said molecular chlorine and from said first heat transfer fluid; and (c) transferring heat from said second heat transfer fluid to a third heat transfer fluid wherein said third heat transfer fluid is substantially isolated from said molecular chlorine, from said first heat transfer fluid, and from said second heat transfer fluid;

wherein said first heat transfer fluid is selected from the group consisting of:

(d) at least one perhalogenated methane represented by the formula $CCl_{(4-i)}F_i$ where i is 1, 2, 3, or 4;

(e) at least one perhalogenated ethane represented by the formula $C_2Cl_{(6-j)}F_j$ where j is 3, 4, 5, or 6;

(f) at least one perhalogenated propane represented by the formula $C_3Cl_{(8-k)}F_k$ where k is 4, 5, 6, 7, or 8;

(g) at least one halogenated ethane represented by the formula $C_2HCl_{(5-x)}F_x$ where x is 3, 4, or 5;

(h) at least one halogenated propane represented by the formula $C_3HCl_{(7-y)}F_y$ where y is 4, 5, 6, or 7;

(i) at least one perfluorinated normal alkane containing from 4 to 8 carbon atoms;

(j) at least one perhalogenated cyclobutane represented by the formula $C_4Cl_{(8-z)}F_z$ where z is 6, 7, or 8;

(k) perfluoro-1,3-dimethylcyclohexane;

(l) perfluoro(methyldecalin); and (m) carbon dioxide; and (n) a mixture thereof.

3. The process of claim 2 wherein said first heat transfer fluid is at least one perhalogenated propane represented by the formula $C_3Cl_{(8-k)}F_k$ where k is 4, 5, 6, 7, or 8.

4. The process of claim 2 wherein said first heat transfer fluid is perfluoropropane.

5. The process of claim 2 wherein said first heat transfer fluid is carbon dioxide.

6. The process of claim 2 wherein said second heat transfer fluid is 1,1,1,2-tetrafluoroethane.

7. The process of claim 2 wherein said third heat transfer fluid is water.

8. The process of claim 2 wherein latent heat from said gaseous molecular chlorine is transferred to vaporizing first heat transfer fluid and wherein heat is transferred from condensing first heat transfer fluid to said second heat transfer fluid.

9. The process of claim 8 wherein heat is transferred from condensing first heat transfer fluid to vaporizing second heat transfer fluid and wherein heat is transferred from condensing second heat transfer fluid to said third heat transfer fluid.

10. The process of claim 8 wherein:

(a) latent heat from said gaseous molecular chlorine is transferred to said vaporizing first heat transfer fluid in a condenser, (b) heat is transferred from said condensing first heat transfer fluid to said second heat transfer fluid in a heat exchanger, (c) said heat exchanger is located at a physically higher elevation than said condenser, and (d) circulation of said first heat transfer fluid through said condenser and said heat exchanger is maintained by convection.

11. The process of claim 10 wherein heat is transferred from condensing first heat transfer fluid to vaporizing second heat transfer fluid and wherein heat is transferred from condensing second heat transfer fluid to said third heat transfer fluid.

12. The process of claim 2 wherein heat is transferred from said third heat transfer fluid to a fourth heat transfer fluid wherein said fourth heat transfer fluid is substantially isolated from said molecular chlorine, from said first heat transfer fluid, from said second heat transfer fluid, and from said third heat transfer fluid.

13. A process for liquifying a substance comprising:

(a) transferring latent heat from said substance in the gaseous state to a first heat transfer fluid passing through a first loop wherein said first heat transfer fluid is substantially isolated from said substance;

(b) transferring heat from said first heat transfer fluid to a second heat transfer fluid passing through a second loop wherein said second heat transfer fluid is substantially isolated from said substance and from said first heat transfer fluid;

(c) transferring heat from said second heat transfer fluid to a third heat transfer fluid passing through a third loop wherein said third heat transfer fluid is substantially isolated from said substance, from said first heat transfer fluid, and from said second heat transfer fluid; and (d) transferring heat from said third heat transfer fluid to a fourth heat transfer fluid wherein said fourth heat transfer fluid is substantially isolated from said substance, from said first heat transfer fluid, from said second heat transfer fluid, and from said third heat transfer fluid;

wherein said first heat transfer fluid is selected from the group consisting of:

(e) at least one perhalogenated methane represented by the formula $CCl_{(4-i)}F_i$ where i is 1, 2, 3, or 4;

(f) at least one perhalogenated ethane represented by the formula $C_2Cl_{(6-j)}F_j$ where j is 3, 4, 5, or 6;

(g) at least one perhalogenated propane represented by the formula $C_3Cl_{(8-k)}F_k$ where k is 4, 5, 6, 7, or 8;

(h) at least one halogenated ethane represented by the formula $C_2HCl_{(5-x)}F_x$ where x is 3, 4, or 5;

(i) at least one halogenated propane represented by the formula $C_3HCl_{(7-y)}F_y$ where y is 4, 5, 6, or 7;

(j) at least one perfluorinated normal alkane containing from 4 to 8 carbon atoms;

(k) at least one perhalogenated cyclobutane represented by the formula $C_4Cl_{(8-z)}F_z$ where z is 6, 7, or 8;

(l) perfluoro-1,3-dimethylcyclohexane;

(m) perfluoro(methyldecalin);

(n) carbon dioxide; and (o) a mixture thereof, and wherein said substance is selected from the group consisting of:

(p) molecular chlorine, (q) molecular bromine, (r) hydrogen fluoride, (s) hydrogen chloride, and (t) hydrogen bromide.

14. A process for liquifying molecular chlorine comprising:

(a) transferring latent heat from gaseous molecular chlorine to a first heat transfer fluid passing through a first loop wherein said first heat transfer fluid is substantially isolated from said molecular chlorine;

(b) transferring heat from said first heat transfer fluid to a second heat transfer fluid passing through a second loop wherein said second heat transfer fluid is substantially isolated from said molecular chlorine and from said first heat transfer fluid;

(c) transferring heat from said second heat transfer fluid to a third heat transfer fluid passing through a third loop wherein said third heat transfer fluid is substantially isolated from said molecular chlorine, from said first heat transfer fluid, and from said second heat transfer fluid; and (d) transferring heat from said third heat transfer fluid to a fourth heat transfer fluid wherein said fourth heat transfer fluid is substantially isolated from said molecular chlorine, from said first heat transfer fluid, from said second heat transfer fluid, and from said third heat transfer fluid;

wherein said first heat transfer fluid is selected from the group consisting of:

(e) at least one perhalogenated methane represented by the formula $CCl_{(4-i)}F_i$ where i is 1, 2, 3, or 4;

(f) at least one perhalogenated ethane represented by the formula $C_2Cl_{(6-j)}F_j$ where j is 3, 4, 5, or 6;

(g) at least one perhalogenated propane represented by the formula $C_3Cl_{(8-k)}F_k$ where k is 4, 5, 6, 7, or 8;

(h) at least one halogenated ethane represented by the formula $C_2HCl_{(5-x)}F_x$ where x is 3, 4, or 5;

(i) at least one halogenated propane represented by the formula $C_3HCl_{(7-y)}F_y$ where y is 4, 5, 6, or 7;

(j) at least one perfluorinated normal alkane containing from 4 to 8 carbon atoms;

(k) at least one perhalogenated cyclobutane represented by the formula $C_4Cl_{(8-z)}F_z$ where z is 6, 7, or 8;

(l) perfluoro-1,3-dimethylcyclohexane;

(m) perfluoro(methyldecalin);

(n) carbon dioxide; and (o) a mixture thereof.

15. The process of claim 14 wherein said first heat transfer fluid is at least one perhalogenated propane represented by the formula $C_3Cl_{(8-k)}F_k$ where k is 4, 5, 6, 7, or 8.

16. The process of claim 14 wherein said first heat transfer fluid is perfluoropropane.

17. The process of claim 14 wherein said first heat transfer fluid is carbon dioxide.

18. The process of claim 14 wherein said third heat transfer fluid is 1,1,1,2-tetrafluoroethane.

19. The process of claim 14 wherein said fourth heat transfer fluid is water.

20. The process of claim 14 wherein latent heat from said gaseous molecular chlorine is transferred to vaporizing first heat transfer fluid and wherein heat is transferred from condensing first heat transfer fluid to said second heat transfer fluid.

21. The process of claim 20 wherein said second heat transfer fluid is aqueous calcium chloride.

22. The process of claim 20 wherein heat is transferred from said second heat transfer fluid to vaporizing third heat transfer fluid and wherein heat is transferred from condensing third heat transfer fluid to said fourth heat transfer fluid.

23. The process of claim 20 wherein:

(a) latent heat from said gaseous molecular chlorine is transferred to said vaporizing first heat transfer fluid in a condenser, (b) heat is transferred from said condensing first heat transfer fluid to said second heat transfer fluid in a heat exchanger, (c) said heat exchanger is located at a physically higher elevation than said condenser, and (d) circulation of said first heat transfer fluid through said condenser and said heat exchanger is maintained by convection.

24. The process of claim 23 wherein said second heat transfer fluid is aqueous calcium chloride.

25. The process of claim 23 wherein heat is transferred from said second heat transfer fluid to vaporizing third heat transfer fluid and wherein heat is transferred from condensing third heat transfer fluid to said fourth heat transfer fluid.

* * * * *